United States Patent [19]

DeShon

[11] Patent Number: 4,604,661

[45] Date of Patent: Aug. 5, 1986

[54] AUTOMATIC SWITCHING APPARATUS AND METHOD

[75] Inventor: Wallace E. DeShon, Bartlesville, Okla.

[73] Assignee: Phillips Petroleum Company, Bartlesville, Okla.

[21] Appl. No.: 668,066

[22] Filed: Nov. 5, 1984

[51] Int. Cl.⁴ .............................................. G11B 15/00
[52] U.S. Cl. ......................................... 360/69; 360/71
[58] Field of Search ...................... 307/38, 39, 40, 41, 307/239; 328/69, 70, 71; 340/286 R, 825; 360/69, 71, 74.1

[56] References Cited

U.S. PATENT DOCUMENTS

| | | | |
|---|---|---|---|
| 3,747,060 | 7/1973 | DeShazo, Jr. ...................... | 340/18 P |
| 3,885,090 | 5/1975 | Rosenbaum ...................... | 178/6.6 A |
| 4,037,259 | 7/1977 | Hammon et al. ................. | 360/66 |
| 4,188,664 | 2/1980 | DeShon ............................ | 364/200 |
| 4,398,272 | 8/1983 | Sibert .............................. | 367/33 |
| 4,422,111 | 12/1983 | Moeller et al. ................... | 360/72.1 |

*Primary Examiner*—George G. Stellar
*Attorney, Agent, or Firm*—William R. Sharp

[57] ABSTRACT

An apparatus and method wherein a switching means, which has the capability of generating one of a number of different output selection signals, is set to an automatic mode or a non-automatic mode. In the automatic mode, the switching means automatically switches from generating one selection signal to another selection signal in response to a predetermined input which includes a control pulse. In the non-automatic mode, no such switching occurs. In addition, the apparatus generates a pseudo-control signal which, in the non-automatic mode only, changes in a predetermined manner in response to the control pulse so as to simulate the control pulse. According to a preferred embodiment, the above functions are performed by a switchover circuit which is employed in a multi-tape well logging system to automatically switch from one tape to another tape upon reaching an end of tape.

23 Claims, 3 Drawing Figures

AUTOMATIC SWITCHING APPARATUS AND METHOD

This invention relates to a switchover circuit whose output signal automatically changes in response to a predetermined input. The invention also relates to a method for accomplishing such a switching of output signals.

The invention is particularly suited for use in a well logging system of the type utilizing magnetic tapes to record data thereon. Such systems include a logging tool carrying one or more exploring or measuring devices which is lowered into a wellbore for measuring various characteristics of sub-surface earth formations. Data from the logging tool is received by a computer which processes the data according to a suitable computer program. In addition, the computer is programmed to send commands and data to a tape drive through a tape drive controller. This type of system typically includes a plurality of tape drives. When the end of the tape in one tape drive is reached, a switch over to a second tape, which is loaded and ready to go, can be accomplished in three ways: (1) programmed switch, or (2) manual switch or (3) automatic switch. The second alternative, manual switching, is most undesirable in downhole well logging since this usually means stopping and restarting the motion of the logging tool. The first alternative, programmed switch, can be realized by including a feature in the computer program whereby upon detection of an end of tape (EOT) signal, the computer commands the switching to another magnetic tape drive. However, the software in logging acquisition systems many times does not include such a feature. Moreover, changing such existing software to accomplish the programmed switch can be extremely expensive and impractical. In addition, to accomplish an automatic switch (alternative (3)) according to prior techniques would require modification of existing hardware. It would, therefore, be desirable to provide for automatic switching without modifying existing software or hardware.

SUMMARY OF THE INVENTION

It is, therefore, an object of the present invention to provide an apparatus and method for automatically switching from one magnetic tape to another magnetic tape in a multi-tape system upon detection of an end of tape signal.

It is also an object of the present invention to provide an apparatus and method for accomplishing such automatic switching which will not require modification of existing software or hardware in a well logging system of the type not having an end of tape switching capability.

The above objects are achieved in an apparatus and method wherein a switching means, which has the capability of generating one of a number of different output selection signals, is set to an automatic mode or a non-automatic mode. In the automatic mode, the switching means automatically switches from generating one selection signal to another selection signal in response to a predetermined input which includes a control pulse. In the non-automatic mode, no such switching occurs. In addition, the apparatus generates a pseudo-control signal which, in the non-automatic mode only, changes in a predetermined manner in response to the actual control pulse so as to simulate the actual control pulse.

According to a preferred embodiment, an electronic circuit, constructed according to the invention to perform the above described functions, is employed in a well logging system having a number of tape drives. Each tape drive has a preselected address, and receives the particular selection signal generated by the switchover circuit. At least a portion of the preselected address for each tape drive corresponds to a particular selection signal such that upon receival of the generated selection signal, one of the drives is selected for operation. At the end of tape, the activated drive generates an end of tape pulse which is received by the circuit as the above-mentioned control pulse. In response to the predetermined input which includes the end of tape pulse, the circuit automatically switches to produce a different selection signal. Thus, a new tape drive is automatically selected in response to the end of tape pulse. Each drive may be selected in a similar manner. Furthermore, a tape controller is provided in the preferred embodiment which controls the drives by sending various command signals to the tape drives. The controller receives the pseudo control signal, this signal changing to simulate the end of tape pulse in the non-automatic mode. The controller responds to this simulated end of tape pulse by terminating its transmission of commands and data to the drives, thus deactivating the selected drive. In the automatic mode, however, the circuit effectively blocks the received end of tape pulse from reaching the controller because the pseudo-control signal does not change in response to the end of tape pulse. Therefore, the controller continues to send command signals and data to the drives and switching of drives in response to the end of tape pulse occurs. The controller sees the automatic switchover as an inter record gap and thus sees the tapes in the tape drives as one continuous tape onto which data is recorded.

The circuit as described above may be easily incorporated into a conventional well logging system to give the system an automatic end of tape switching capability without changing existing hardware or software. Thus, the circuit provides a simple and inexpensive alternative to modifying existing hardware or software to achieve an end of tape switching capability.

DESCRIPTION OF THE PREFERRED EMBODIMENTS

As used herein, "high" denotes one of two possible states of a binary information signal wherein a voltage level of, for example, about +4 volts represents a "1" state, and "low" denotes the other possible state wherein a voltage level of, for example, about zero volts represents a "0". Additionally, the term "signal" as used herein and in the appended claims may denote a single detectable signal or a plurality of related discrete signals.

Figure 1:
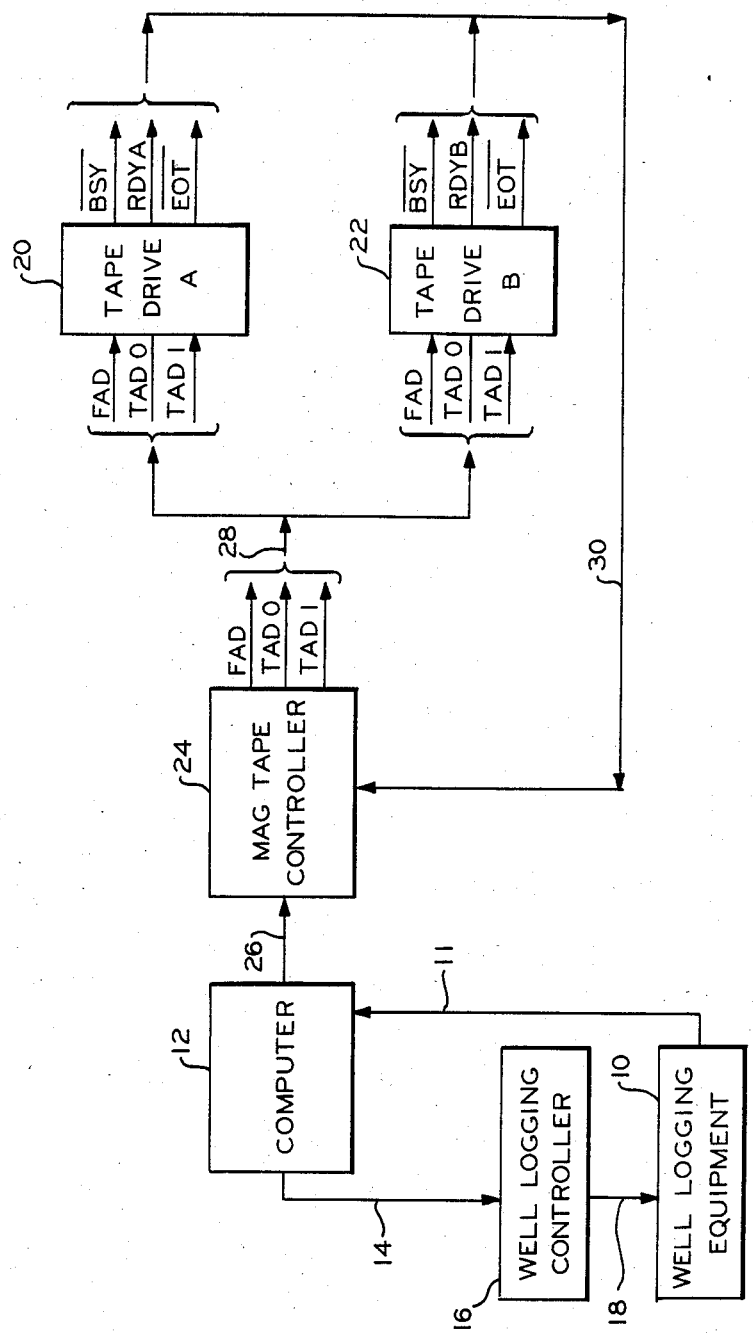
FIG. 1 is a schematic block diagram of a conventional well logging system employing magnetic tapes.

Referring now to FIG. 1, there is schematically illustrated a conventional well logging system which utilizes a pair of magnetic tapes onto which well logging data may be recorded. The illustrated conventional system includes well logging equipment 10 for making various well logging measurements, which typically comprises a well logging tool suspended on a cable in a wellbore. As the tool is moved within the wellbore, electrical signals are produced which are representative of selected subsurface earth formation characteristics. These signals are supplied to a computer 12 via line 11 for processing by a central processing unit (CPU) according to a suitable computer program. Such processing could take the form of enhancing raw data by making deconvolution or skin effect corrections or combining data from several exploration devices (shown, for example, in U.S. Pat. No. 3,638,484). Once the data is processed, it is typically transferred to a memory within computer 12. Computer 12 is programmed to send various command signals via line 14 for controlling movements of the well logging equipment. These command signals are typically interfaced through a well logging controller 16 which transmits control signals along line 18 to well logging equipment 10.

Means will now be described for recording selected data from computer 12 onto magnetic tapes in tape drives A and B, denoted by reference characters 20 and 22 respectively. A magnetic tape controller 24 is provided for receiving various signals from computer 12 via line 26. These signals include address signals representative of an address. Typically, different addresses are sequentially fed into tape controller 24 according to the computer program, wherein each address corresponds to a particular tape drive, as will be explained in more detail below. These address signals from computer 12 are usually in a 16 bit digital format, and are processed by tape controller 24 so as to correct the 16 bit address signal to, by way of example, a 3 bit digital address signal which includes a formatter address (FAD) bit, and two tape address (TAD 0 and TAD 1) bits. The FAD bit derives its name from past systems which utilized this bit, "1" or "0", to select one of two formatters. In the illustrated system, however, the FAD output of controller 24 is simply one bit of a 3 bit tape drive digital address. The use of the term "FAD" is usually retained in this type of system despite the fact that its name does not imply any particular functional significance. As shown, the 3 bit digital address output of controller 24 is utilized as an input via bus 28 to tape drives 20 and 22. Each tape drive has a preselected or preset address, and a means therein for comparing its preselected address to the 3 bit digital address received from controller 24. If a tape drive's preselected address matches that address from controller 24, this particular drive is enabled to be activated. Although not shown, tape controller 24 supplies various command signals in addition to the address signal such as for tape manipulation (i.e. rewind, fast forward, etc.) and also supplies data signals to the tape drives for recording on the tapes therein. All command signals from controller 24 are generated in response to signals from the computer according to the program. Tape controller 24 typically has direct memory access (DMA) enabling the controller to retrieve data directly from memory in computer 12 in response to signals from the CPU. Therefore, upon receival of a 3 bit address corresponding to the preselected address of a particular tape drive, the tape drive will respond to the various commands from controller 24. Most importantly, when this condition of the preset tape drive address matching the address from controller 24 is satisfied, this particular drive will respond to commands to drive the tape and record data thereon. Additionally, the tape drives generate signals, including $\overline{BSY}$, RDY, and $\overline{EOT}$, representative of certain tape drive conditions. For example, upon reaching the end of tape, an end of tape $\overline{EOT}$ signal makes a transition to a certain state, as described below, representative of the end of tape. $\overline{EOT}$ is received by controller 24 via bus 30. Most typically, controller 24 responds to the above-mentioned state of $\overline{EOT}$ by terminating its commands to the tape drives. Thus, upon detection of an end of tape, the tape drives are deactivated and transmission of data thereto terminated. It should be understood that each drive has an associated EOT signal which is coupled into an open collector NAND gate. The NAND gate outputs are chained or hard wired (wire-ored) together to give the $\overline{EOT}$ signal. Each tape drive is shown as producing an $\overline{EOT}$ signal for ease of illustration. The $\overline{BSY}$ signal is produced in a manner similar to the $\overline{EOT}$ signal. All of these signals will be discussed in further detail in connection with FIG. 2.

A well logging system as described above is described in detail in U.S. Pat. No. 4,398,272 of Sibert, whose disclosure is herein incorporated by reference.

Most notably, such a system has no capability to automatically switch over from one tape to another tape upon detection of an end of tape. The operator must simply place another tape in the tape drive when the end of tape was reached, and restart the system at the point in the program where it left off.

Figure 2:
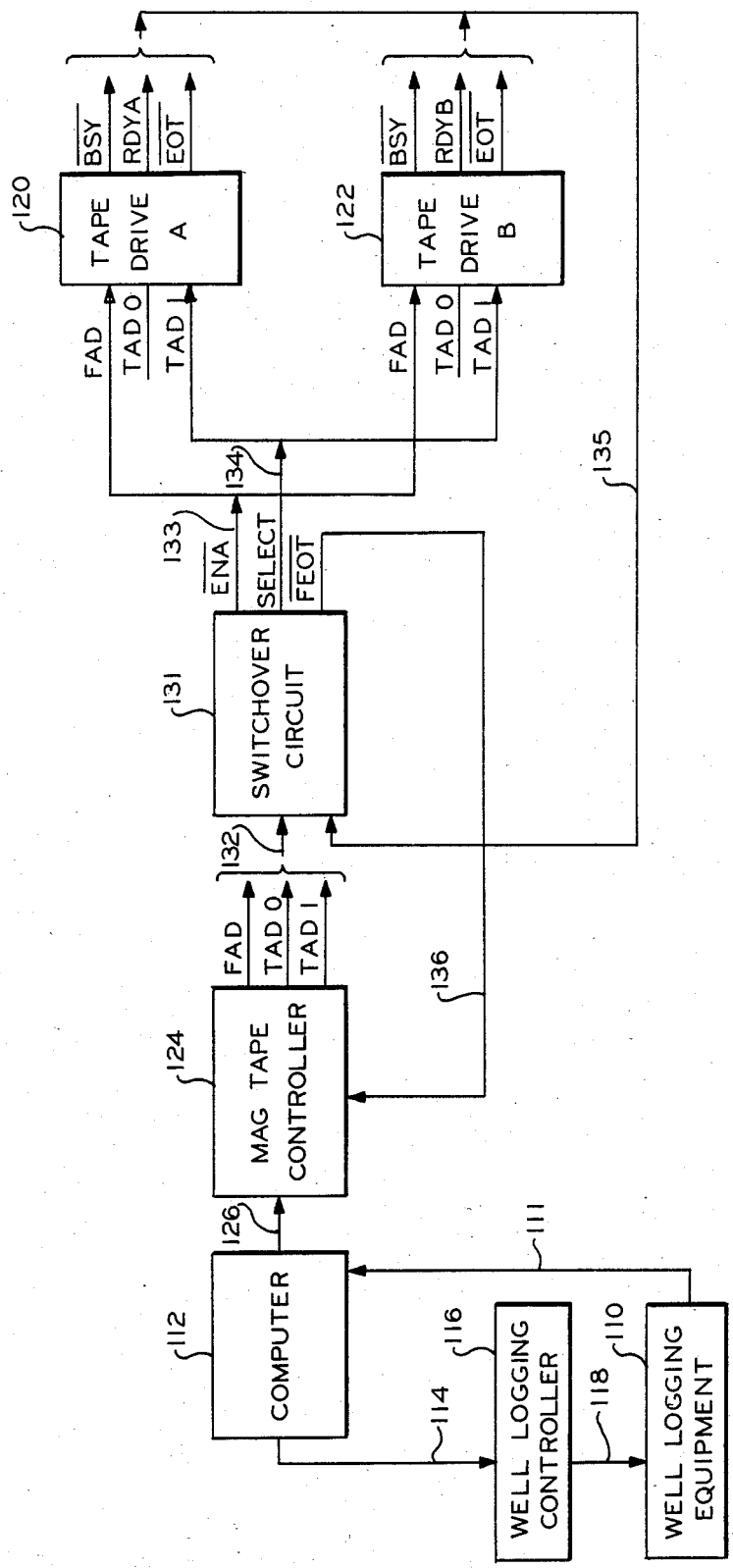
FIG. 2 is a schematic block diagram of a well logging system employing a switchover circuit according to the invention.

Referring now to FIG. 2, there is schematically illustrated a well logging system in accordance with the present invention. This system includes well logging equipment 110 for sending data signals via line 111 to computer 112, a well logging controller 116 for interfacing command signals received via line 114, tape controller 124 for receiving address signals from computer 112 via line 126, and tape drives 120 and 122. These components individually are substantially similar to those corresponding components described in connection with the conventional system of FIG. 1.

In the system shown in FIG. 2, however, a circuit 131, hereinafter called a "switchover circuit", is provided for receiving the 3 bit address from controller 124 through bus 132. Each bit in this address, hereinafter denoted the input address, is processed according to the invention to yield a 2 bit output address which comprises an $\overline{ENA}$ (ENA standing for "enable") output signal representing one bit of the output address, and a SELECT output signal representing the other bit of the output address. As shown, the SELECT and $\overline{ENA}$ output signals are utilized as respective inputs to the FAD and TAD 1 inputs of tape drives 120 and 122, and are coupled into the drives by means of buses 133 and 134 respectively. The TAD 0 input of each drive is left unconnected. This input, like other inputs to the tape drive, has a pull-up resistor associated therewith such that the drive perceives the input to the unconnected TAD 0 input as a "1", a feature common in such systems and well known to those skilled in the art.

A particularly suitable tape drive for use in the present invention is the Model 6470 cartridge tape system available from the Kennedy Corporation of Monrovia, Calif. Although other commercially available tape drives would be equally suitable, the preferred embodiment shown in FIG. 2 will be described in reference to this particular tape drive for the sake of convenience. The illustrated FAD, TAD 0, and TAD 1 inputs are conventional connector inputs on the model 6470. Additionally, $\overline{BSY}$, RDY, and $\overline{EOT}$ outputs for drives A and B are coupled through bus 135 as inputs to switchover circuit 131. Each of these drive outputs will now be discussed in further detail.

$\overline{BSY}$ denotes a "busy" signal which is representative of whether the tape is being driven or is stationary. When the tape is moving, $\overline{BSY}$ is low or "0". When the tape stops being driven, $\overline{BSY}$ goes high so as to represent a "1". Typically, several sets of data are recorded on a particular tape. The tape is accordingly driven during recording of one set of data, and stopped before the next set is recorded. This gap between sets of data is called an "inter record gap", during which $\overline{BSY}$ goes high. The $\overline{BSY}$ signal is taken directly from a conventional output connector on the model 6470.

The $\overline{EOT}$ output is also taken directly from conventional connectors on the model 6470. During normal operation, $\overline{EOT}$ is high. However, when the approximate end of tape is reached, some sort of detectable mark or perforation in the tape is detected by a suitable and conventional means in the tape drive, causing $\overline{EOT}$ to go low.

The RDYA and RDYB outputs are utilized by switchover circuit 131 to determine if a drive is at the beginning of tape (BOT). These outputs are the conventional $\overline{BOT}$ or $\overline{LDPT}$ (loadpoint) outputs on the model 6470 prior to being gated to an output connector. In the model 6470, the output signals utilized as RDYA and RDYB are gated through a gating network and inverted prior to being received by the drive output connectors as $\overline{BOT}$ or $\overline{LDPT}$ signals. Therefore, RDYA or RDYB is normally low, but goes high if the drive is at the beginning of tape.

The above described outputs of tape drivers 120 and 122 are fed into switchover circuit 131, and are processed according to the present invention. When a predetermined set of input signals is received by circuit 131, the SELECT output signal switches from "0" to "1" or "1" to "0", as will be explained in more detail below. Additionally, under certain conditions, a pseudo-control signal, herein called an $\overline{FEOT}$ signal, substantially similar to a received $\overline{EOT}$ signal is generated by circuit 131 and utilized as an input to tape controller 124 via line 136.

Figure 3:
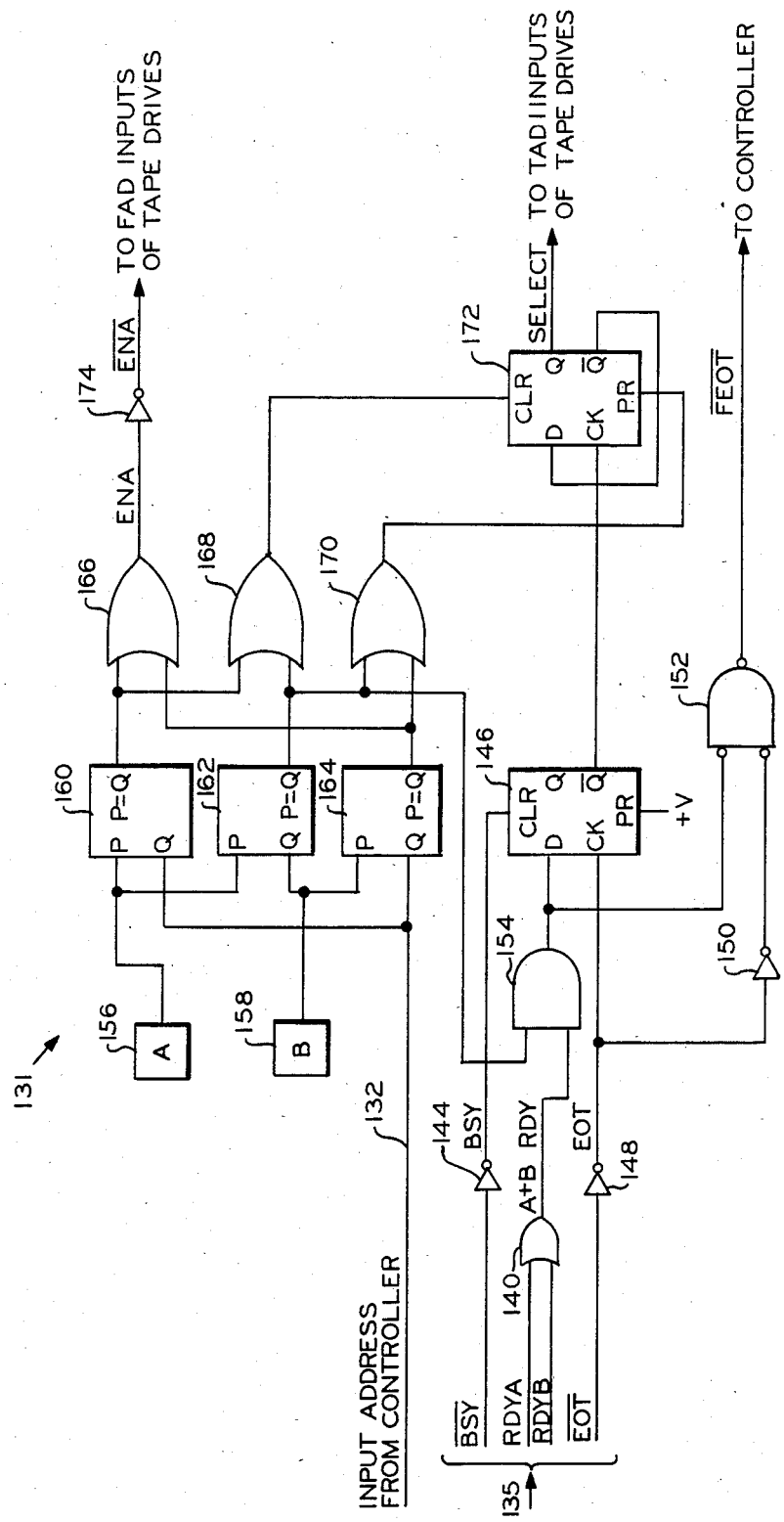
FIG. 3 is a schematic diagram of a preferred switchover circuit.

Referring now to FIG. 3, there is shown a schematic diagram of a preferred switchover circuit 131 in accordance with the present invention. RDYA is applied to one of the two inputs of OR gate 140, and RDYB is applied to the other input. $\overline{BSY}$ is connected through an inverter 144 to the Clear (CLR) input of flip-flop 146, which is preferably a D-type flip-flop. Similarly, $\overline{EOT}$ is connected through an inverter 148 to the Clock (CK) input of flip-flop 146 and to the input of inverter 150, whose output is applied to one of the two inputs of OR gate 152. OR gate 152 is shown as a "notted" AND gate having inverted inputs and an inverted output to emphasize its functional significance, as will become apparent in connection with the description of the circuits operation. The output of OR gate 140 is coupled into one of the two inputs of AND gate 154. The Preset (PR) input of flip-flop 146 is maintained at positive voltage.

The switchover circuit shown in FIG. 3 further comprises thumbwheel switches 156 and 158 which are each capable of selectively generating one of a plurality of digital signals representative of addresses. It should be understood, of course, that some voltage supply must be utilized in conjunction with switches 156 and 158 and also in conjunction with the switchover logic circuit, but this is not shown for clarity of illustration. Typically, switches of the thumbwheel type have rotable digit selectors easily adjustable by hand to select a representative address. In addition, each of switches 156 and 158 have a several bit output, for example four, which is shown in the Figure as only one line. As shown, an address signal generated by means of thumbwheel 156 is applied to one of two inputs to comparator 160, and to one of the two inputs to comparator 162. The address signal from thumbwheel switch 158 is coupled into the other input of comparator 162 and to one of two inputs to comparator 164. Bus 132 carries the input address signal from tape controller 124 to the other input of comparator 160 and to the other input of comparator 164. Comparators 160, 162, 164 may be, by way of example, 4 bit comparators such that each input would include four input lines, one for each bit. Again, the various lines for each input are shown as only one line for clarity of illustration. Each comparator conventionally compares its two inputs, and produces a high signal at its output if the two inputs are substantially equivalent, and a low signal at its output if the inputs are not equivalent. In respect to the output of each comparator, the output of comparator 160 is applied to one of two inputs to OR gate 166 and to one of two inputs to OR gate 168. The output of comparator 162 is applied to the other input of OR gate 168, and to one of two inputs of OR gate 170, and to the other input of AND gate 154. Finally, the output of comparator 164 is coupled into the other input of OR gate 166 and to the other input of OR gate 170. The output of AND gate 154 is received at the data (D) input of flip-flop 146 and at the other input of OR gate 152. The illustrated switchover circuit also includes a second flip-flop 172, also preferably of the D-type, whose CK input receives the $\overline{Q}$ output of flip-flop 146. The outputs of OR gates 168 and 170 are respectively applied to the CLR and PR inputs of flip-flop 172, and the $\overline{Q}$ output is connected to the D input. As to the switchover circuit outputs, the output of OR gate 166 is connected through inverter 174 which produces ENA, the Q output of flip-flop 172 is SELECT, and the output of AND gate 152 is $\overline{FEOT}$.

Various modifications of the circuit shown in FIG. 3 are possible as will be apparent to those skilled in the art, as long as the circuit functionally performs as described below. For example, comparators 160, 162, 164; OR gates 166, 168, and 170; and inverter 174 may be conveniently replaced by a PLA, programmable logic array, circuit.

The operation of the above described circuit will now be discussed in conjunction with the apparatus of FIG. 2. Since the circuit can operate in either of two modes, automatic or non-automatic, each mode will be discussed separately. It will be assumed in these discussions that tape drive 120 has a preselected 3 bit address wherein the bit corresponding to the TAD 1 input is 1, whereas tape drive 122 has a preselected address wherein the bit corresponding to TAD 1 is 0. The bits corresponding to the FAD inputs are set to 0 on each drive. In respect to the bit corresponding to TAD 0, this bit is set at 1 on each drive. As discussed above, the TAD 0 input on each drive is left unconnected, such that the input signal to TAD 0 is always 1. Therefore, the input bit to TAD 0 on each drive always matches the preselected bit. Since this matching condition in respect to TAD 0 is always satisfied, only the FAD and TAD 1 inputs have any determinative effect. Therefore, the TAD 0 inputs will not be further discussed. The preselected address for each drive is set by means of internal switches provided on the model 6470 drive. It is also emphasized that although particular preselected addresses are being assumed as an illustrative example to assist in understanding the invention, the preselected addresses at which the drives set are completely arbitrary. For example, the bits corresponding to FAD could be set at 1 rather than 0. However, the circuit design would be modified slightly by deleting inverter 174.

The automatic mode of operation will first be discussed. To set the circuit in the automatic mode, the thumbwheel switches are set to the same addresses. Therefore, the two address signals applied to comparator 142 are substantially equivalent so that it produces a high output signal which is applied to the inputs of OR gates 168 and 170 and AND gate 154. OR gates 168 and 170 therefore produce high outputs, regardless of the state of the other input to these gates, which are received by the PR and CLR inputs of flip-flop 172. Thus, the PR and CLR inputs make a transition from low to high. This transition is unstable, such that it cannot be determined whether output Q, or SELECT, will be high or low. However, for the purpose of the automatic mode, whether SELECT is initially high or low is not really important. Assume, then, for the sake of illustration that SELECT is initially low or 0, this signal being applied to the TAD 1 inputs of both drives. As noted above, the preselected address bit corresponding to the TAD 1 input is 1 in drive 120 and 0 in drive 122. Thus the SELECT output of 0 matches the preselected TAD 1 address bit for drive 122 so that drive 122 has been selected for operation. However, in order for the drive to respond to commands from controller 124, the $\overline{\text{ENA}}$ signal applied to the FAD input must be 0, since 0 was arbitrarily preselected as the tape drive address bit for the FAD input. The source of the $\overline{\text{ENA}}$ signal will now be discussed.

The input address signal from controller 124 is compared to the switch 156 address signal and the switch 158 address signal by comparators 160 and 164 respectively. As noted above, in the automatic mode, the thumbwheel switch address signals are equivalent. If the input address signal matches the switch address signals, their comparators 160 and 164 both produce high output signals which are coupled into OR gate 166. OR gate 166 accordingly generates a high ENA signal which is inverted by inverter 174 to a low $\overline{\text{ENA}}$ signal representative of 0. This low $\overline{\text{ENA}}$ signal is applied to the drive FAD inputs, which as noted above have corresponding preselected address bits of 0. Therefore, when the addresses set by thumbwheel switches 156 and 158 are equivalent to the input address, $\overline{\text{ENA}}$ will correspond to the preselected FAD bits. Furthermore, when this condition is met and SELECT is low, tape drive 122 is accordingly enabled for activation by controller 129. It is emphasized that both the SELECT and $\overline{\text{ENA}}$ output signals must match the preselected FAD and TAD 1 address bits in order for a tape drive to be enabled to respond to commands.

Assume further for the sake of illustration that tape drive 122 receives commands to be driven and to record data received thereby.

As already noted, each thumbwheel switch is set to equivalent addresses to set the circuit in the automatic mode. The switch address signals are received and compared by comparator 162, which generates a high output signal in response thereto. This high output signal representative of the automatic mode is applied to one input of AND gate 154. While tape drive 122 is being driven, tape drive 120 is typically at the beginning of tape ready to go. Thus, RDYA is high. Even though tape drive 120 is not receiving its address at this point, the RDYA signal is high since this signal is taken from the BOT signal before entering the tape drive gating network, whose outputs go to the tape drive output connectors. Therefore, since the RDYA input to OR gate 140 is high, the A+B RDY input signal to AND gate 154 is also high. AND gate 154 accordingly generates a high output signal which is applied to the D input of flip-flop 146. Additionally, as tape drive 122 is being driven, $\overline{\text{BSY}}$ is low. Since $\overline{\text{BSY}}$ is a "wire-ored" signal, only the selected tape drive will control its state. $\overline{\text{BSY}}$ is inverted to a high BSY signal by inverter 144. Thus, BSY is applied to the CLR input of flip-flop 146 as a high signal. In summary, then, various inputs to flip-flop 146 are as follows while tape drive 122 is being driven but before an end of tape is reached; CLR is high; PR is high; and D is high. In this condition, flip-flop 146 has a high $\overline{\text{Q}}$ output and a low Q output. In this state, flip-flop 146 can change states only if the rising edge of a pulse is received at its CK input.

While tape drive 122 is running, $\overline{\text{EOT}}$ is normally high. Since $\overline{\text{EOT}}$ is a "wire-ored" signal only the selected drive will control its state. This high output is inverted to a low EOT signal which is applied to the CK input of flip-flop 146. When tape drive 122 comes to the end of tape, $\overline{\text{EOT}}$ drops low so that EOT goes high. This low to high transition is essentially an end of tape pulse having a rising edge which is applied to CK of flip-flop 146, thereby causing $\overline{\text{Q}}$ to switch from a high state to a low state. In addition, the high EOT signal or end of tape pulse is inverted by inverter 150 and applied to one input of OR gate 152. Therefore, this input to OR gate 152 is normally high, but drops low when an end of tape is reached. As already noted, drive 120 is at the beginning of tape such that A+B RDY, applied to an input of AND gate 154, is high. The other input to AND gate 154 is also high since the two thumbwheel switch addresses are equal, this condition being representative of the automatic mode. The output of AND gate 154 is therefore high and is received at the other input of OR gate 152. Therefore, at the time drive 122 reaches the end of tape and one input of OR gate 152 goes low, the other input remains high thereby causing OR gate 152 to generate a continuous high output signal. The output of OR gate 152 is high before the end of tape, at the end of tape, and after the end of tape. If the circuit is in the automatic mode and one drive is ready or at BOT, therefore, the end of tape pulse is effectively trapped by OR gate 152. $\overline{\text{FEOT}}$ is continuously high and is received by tape controller 124. Tape controller 124 typically recognizes a low signal on $\overline{\text{FEOT}}$ as an end of tape. Thus, the continuously high $\overline{\text{FEOT}}$ signal is not recognized by the controller as an end of tape and command signals from the controller continue to be sent to the drives in accordance with the computer program.

After the end of tape mark is detected in tape drive 122, the tape will continue to be driven and have a particular set of data recorded thereon if the appropriate command signals are received from tape controller 124. When the end of a particular data set is reached, controller 124 typically commands drive 122 to stop in what is called an inter record gap. Thus, BSY drops low as the CLR input of flip-flop 146. When PR is high and CLR is low in flip-flop 146, $\overline{\text{Q}}$ returns high. As noted, the $\overline{Q}$ output of flip-flop 146 is applied to the CK input of flip-flop 172. Therefore, when $\overline{Q}$ goes from low to high, this serves as a "rising edge" clock pulse to flip-flop 172, causing flip-flop 172 to toggle so as to switch Q to a high output. The SELECT signal applied to the drive TAD 1 inputs has therefore been switched from 0 to 1. Since the address bit corresponding to the TAD 1 input of tape drive 120 is a 1, this tape drive is now automatically selected in what appears to tape controller 124 as an inter record gap. Even though drive 120 has been selected, the drive receives its corresponding address only if the input address matches the thumbwheel switch addresses, thus causing a low $\overline{ENA}$ signal to be produced.

Assuming tape drive 120 is now being driven, neither drive is at the beginning of tape. Accordingly, A+B RDY is low so that the AND gate 154 output signal applied to one input of OR gate 152 is low. When the end of tape in tape drive 120 is reached, the other input to AND gate 152 goes from high to low so that $\overline{FEOT}$ drops from high to low. Note that when neither drive is at beginning of tape, the end of tape pulse is not trapped as before. Therefore, the low $\overline{FEOT}$ signal is recognized by controller 124 as an end of tape. In response, tape controller 124 stops sending data and command signals to the tape drives. Employing the A+B RDY input signal as shown and described is preferable because this prevents transmission of data and command signals to the tape drives when no tape is available for recording.

To summarize device operation in the automatic mode, the switchover circuit acts to automatically switch from selection of one drive to another drive in response to a predetermined input which includes a pulse representative of an end of tape. During this switchover, the switchover circuit does not allow an end of tape signal pulse to reach the tape controller. Thus, the controller continues to send data to the drives and sees both tapes as one continuous tape having a particular address as set by the thumbwheel switches.

The non-automatic mode of operation will now be discussed in terms of the illustrative example. The circuit is set to operate in the non-automatic mode by setting the thumbwheel switches to unequal addresses. Thus, the output of comparator 162 which receives both switch address signals as inputs is always low. This is in contrast to the automatic mode wherein the output of comparator 162 is always high, this high output being coupled through OR gates to both the CLR and PR inputs of flip-flop 172. It is important to note that at this point that flip-flop 172 will change states in response to the rising edge of a pulse at the CK input only when both PR and CLR inputs are high. In other words, the CK input is a "don't care" input if either CLR or PR is low.

Assuming now for the sake of illustration that the above address of thumbwheel switch 156 matches the input address, comparator 160 accordingly generates a high output signal which is fed through OR gate 168 to the CLR input of flip-flop 172. Necessarily, then, since both thumbwheel addresses in this mode cannot equal the input address simultaneously, the thumbwheel switch address 158 does not match the input address, causing comparator 164 to generate a low signal which is coupled through OR gate 170 to the PR input of flip-flop 172. Therefore, CLR is high and PR is low. Flip-flop 172 responds to this set of inputs by generating a high Q output, or a 1 for SELECT. Accordingly, tape drive 120 (having a preselected 1 for the TAD 1 input) is selected. Furthermore, since the thumbwheel switch 156 address equals the input address, comparator 160 generates in response thereto a high signal which is coupled through OR gate 166 and inverter 174 so a to produce a low $\overline{ENA}$ signal which matches the FAD bit of drive 120. Tape drive 120, corresponding to thumbwheel 156, is accordingly enabled to be activated according to commands from controller 124. It should also be noted that since one of the CLR and PR inputs is low, the CK input of flip-flop 172 is a "don't care" input. Therefore, any changes of state of flip-flop 146, whose $\overline{Q}$ output is applied to the CK input of flip-flop 172, are irrelevant and have no effect on the state of flip-flop 172.

In the non-automatic mode, the output of comparator 162 is always low in view of the nonequivalence of the thumbwheel addresses. This low signal is received by AND gate 154 which in response generates a low output. When tape drive 120 comes to the end of tape, EOT goes from low to high, this signal being inverted by inverter 150 to a low signal. OR gate 152 receives the low output signal of AND gate 154 and the low output signal (representative of the end of tape) of inverter 150 and generates in response thereto a low $\overline{FEOT}$ signal. This low $\overline{FEOT}$ signal is received by controller 124 and is recognized as an end of tape. Accordingly, controller 124 stops sending commands to drive 120 and transmission of data to drive 120 is halted. Thus, in the non-automatic mode, the switchover circuit generates a pseudo-control or $\overline{FEOT}$ signal substantially equivalent to the $\overline{EOT}$ signal, wherein the $\overline{FEOT}$ signal changes in a predetermined manner (drops from high to low in this case) in response to a pulse representative of an end of tape (the transition of $\overline{EOT}$ from high to low, or viewed another way, the transition of EOT from low to high) so as to simulate the end of tape pulse. Effectively, then, the circuit in the non-automatic mode allows the pulse representative of the end of tape to pass to controller 124.

Assuming now that the input address matches the thumbwheel 158 address, the PR input of flip-flop 172 will go high, and CLR will drop low. SELECT is low or 0 in response to these input conditions. Thus, drive 122 is selected. Since one of the thumbwheel addresses equals the input address, $\overline{ENA}$ is low, and tape drive 122 receives an address corresponding to its preselected address and is enabled to be activated. Again, $\overline{FEOT}$ drops low when the end of tape is reached.

Assuming now that the input address equals neither thumbwheel address, the CLR and PR inputs of flip-flop 172 generates a high SELECT signal. However, neither drive receives its corresponding address because $\overline{ENA}$ is high.

To summarize, in the non-automatic mode, each tape drive can be given an independent address by setting their corresponding thumbwheel switches accordingly. A signal pulse representative of an end of tape is effectively allowed to pass through the switchover circuit to the tape controller.

Specific components which can be utilized in constructing the above-described apparatus in accordance with the invention are as follows:

| Component | Description |
|---|---|
| Computer 112 | PDP-11<br>Digital Equipment Corp.<br>Maynard, Mass. |

-continued

| Component | Description |
| --- | --- |
| Magnetic tape controller 124 | Industry standard ½" tape interface and controller. Distributed Logic Corp. Garden Grove, California |
| Tape drives 120 and 122 | Model 6470 Kennedy Corp. Monrovia, California |
| Thumbwheel switches 156 and 158 | Series 731 Digitran Co. Pasadena, CA 91105 |
| OR gates 138, 140, 142, 152, 154, 166, 168, and 170 | 7432 |
| Comparators 160, 162, and 164 | 7485 |
| AND gates 152 and 154 | 7408 |
| Inverters 150 and 174 | 7404 |
| Flip-flops 146 and 172 | 7474 |

The "74" series components listed above are commercially available from several manufacturers, including the Signetics Corporation. These "74" series components are described in a Data Sheet of the Signetics Corporation, Sunnyvale, CA.

A switchover circuit constructed according to the present invention may be easily incorporated into a system which utilizes a plurality of addressable tape drives and which has no end of tape switching capability. The switchover circuit gives such a system an automatic end of tape switching capability, as well as a non-automatic mode, without changing existing hardware or software which can be very expensive and/or time consuming. This can be readily observed in FIG. 2 which illustrates how the switchover circuit is incoporated into a well logging system by using conventional connector outputs and inputs on the tape drives and magnetic tape controller.

Obviously, many modifications and variations of the present invention are possible in light of the above teachings. For example, the above-described apparatus could be readily adapted to a system having more than two tape drives. In addition, although the switchover circuit is described in the environment of a well logging system, the circuit could be employed in any system which utilizes a plurality of addressable devices wherein automatic switching from one device to another is desired providing some control signal is produced by the devices.

What is claimed is:

1. An apparatus comprising:
a mode setting means for selectively generating an automatic mode signal representative of an automatic mode, or a non-automatic mode signal representative of a non-automatic mode;
a switching means for receiving either mode signal so as to be set in a respective mode, said switching means having the capability of generating a number of different possible selection signals, only one selection signal being generated at any one time, wherein in the automatic mode, said switching means automatically switches from generating one selection signal to another selection signal in response to receival of a predetermined input which includes a control pulse, and wherein in the non-automatic mode, one selection signal does not switch to another selection signal in response to said predetermined input; and
a signal capturing means for receiving said first control pulse and for generating, in the non-automatic mode, a pseudo-control signal which changes in a predetermined manner in response to said control pulse so as to simulate said control pulse, said signal capturing means being unresponsive to said control pulse when said switching means is set in the automatic mode.

2. An apparatus as recited in claim 1, further comprising:
at least one generator means for generating a generator signal representative of an address, said generator means having the capability of selectively generating one of a number of different signals representative of different addresses; and
comparison means for receiving an input address signal representative of an input address and for comparing said input address signal to said generator address signal, said comparison means generating an enable signal if said generator address signal is substantially equivalent to said input address signal, wherein said generated selection signal and said enable signal together represent an output address such that each possible selection signal and said enable signal together represent a different output address.

3. An apparatus as recited in claim 2, wherein said apparatus includes a plurality of generator means, each said generator means being a part of said mode setting means and generating a respective generator signal, wherein said mode setting means generates said signal representative of the automatic mode if all of said generator signals are substantially equivalent, said signal representative of the non-automatic mode being generated if said generator signals are substantially nonequivalent.

4. An apparatus as recited in claim 3, wherein each said generator means has a corresponding possible selection signal, and wherein, in the non-automatic mode only, in response to one generator signal associated with one generator means being substantially equivalent to said input address signal, said switching means generates a selection signal corresponding to said one generator means.

5. An apparatus as recited in claim 4, further comprising a plurality of devices, each of which receives said generated selection signal and said enable signal, and wherein each device has a preselected address corresponding to a particular output address.

6. An apparatus as recited in claim 5, wherein each drive is enabled to be activated to perform a predetermined operation if it receives an enable signal and selection signal representative of its preselected address, said enabled device generating said control pulse at a predetermined point in its operation.

7. An apparatus as recited in claim 6, wherein each said device is a tape drive having a magnetic tape therein, said control pulse being an end of tape pulse representative of an approximate end of tape.

8. An apparatus as recited in claim 7, further comprising a control means for supplying said input address signal and for receiving said pseudo-control signal.

9. An apparatus as recited in claim 8, wherein said control means includes a magnetic tape controller.

10. An apparatus as recited in claim 9, wherein said predetermined input further includes a ready signal representative of the condition wherein at least one of said tape drives is at the approximate beginning of tape.

11. An apparatus comprising:
a plurality of tape drives having magnetic tapes therein, each said tape drive having the capability of generating an end of tape pulse representative of the condition wherein an end of tape has been reached;

a switchover circuit which includes a mode setting means for selectively generating an automatic mode signal representative of an automatic mode, or a non-automatic mode signal representative of a non-automatic mode, said circuit also including a switching means for receiving either mode signal so as to be set in a respective mode, said switching means having the capability of generating a number of different possible selection signals, only one selection signal being generated at any one time, wherein in the automatic mode, said switching means automatically switches from generating one selection to another selection signal in response to receival of a predetermined input from said drives which includes said end of tape pulse, and wherein in the non-automatic mode, one selection signal does not switch to another selection signal in response to said predetermined input, and wherein said circuit also includes a signal capturing means for receiving said end of tape pulse and for generating, in the non-automatic mode, a pseudo-control signal which changes in a predetermined manner in response to said end of tape pulse so as to simulate said end of tape pulse, said signal capturing means being unresponsive to said end of tape pulse when said switching means is set in the automatic mode, wherein said generated selection signal is received by said tape drives, each said possible selection signal corresponding to a particular tape drive, a tape drive being selected if it receives its corresponding selection signal such that in response to switching of the selection signals, selection of one drive is switched to another drive.

12. An apparatus as recited in claim 11, further comprising a control means for controlling said tape drives by transmitting command and data signals thereto, said control means receiving said simulated end of tape pulse and in response thereto terminating transmission of command and data signals to the tape drives.

13. A method comprising:
selectively generating automatic or non-automatic mode signals representative of respective automatic and non-automatic modes;
generating a first selection signal from the switching means;
generating a predetermined input to the switching means during generation of the first selection signal, wherein the input includes a control pulse;
generating a second selection signal from the switching means in response to the predetermined input only if the switching means is in the automatic mode, generation of the first selection signal continuing after receival of the input if the switching means is in the non-automatic mode; and
generating a pseudo-control signal which changes in a predetermined manner in response to said control pulse so as to simulate said control pulse if the switching means is in the non-automatic mode.

14. A method as recited in claim 13, further comprising:
generating at least one generator signal representative of an address;
generating an input address signal; and
comparing said at least one generator signal to said input address signal and generating an enable signal if said generator signal is substantially equivalent to said input address signal.

15. A method as recited in claim 14, wherein a plurality of different generator signals are generated, said automatic signal being generated in response to the condition wherein said generator signals are all equivalent, said non-automatic signal being generated in response to the condition wherein said generator signals are nonequivalent.

16. A method as recited in claim 15, wherein the switching means has the capability of generating a plurality of different possible selection signals, only one of which can be generated at any one time, said method further comprising the step of generating from the switching means a predetermined selection signal in response to the condition wherein one generator signal is substantially equivalent to said input address signal, each possible selection signal being associated with a particular generator signal being equivalent to said input address signal.

17. A method as recited in claim 16, wherein said enable signal and each said possible selection signal represent a different output address, said method further comprising providing a plurality of devices, each device having a preselected address corresponding to a particular output address; and introducing said enable signal and said generated selection signal to each device.

18. A method as recited in claim 17, wherein each device is enabled to be activated to perform a predetermined operation if it receives an enable signal and selection signal representative of its preselected address, said method further comprising: generating said control pulse by means of said enabled device at a predetermined point in its operation.

19. A method as recited in claim 18, wherein each device is a tape drive having a magnetic tape therein, said control pulse being an end of tape pulse representative of an approximate end of tape.

20. A method as recited in claim 19, wherein a magnetic tape controller is provided for generating said input address signal, said method further comprising the step of introducing said pseudo-control signal to the controller.

21. A method as recited in claim 10, wherein said predetermined input further includes a ready signal representative of the condition wherein at least one of said tape drives is at the approximate beginning of tape.

22. A method comprising:
providing a plurality of tape drives having magnetic tapes therein, each drive having the capability of generating an end of tape pulse representative of an end of tape, selectively generating automatic or non-automatic mode signals representative of respective automatic and non-automatic modes;
introducing either of said mode signals to a switching means so as to set the switching means in a respective mode;
generating a first selection signal from the switching means,
generating a predetermined input to the switching means during generation of the first selection signal, wherein the input includes an end of tape pulse from one tape drive;
generating a second selection signal from the switching means in response to the predetermined input only if the switching means is in the automatic mode, generation of the first selection signal continuing after receival of the input if the switching means is in the non-automatic mode, wherein each said generated selection signal is received by said drives, each signal corresponding to a particular drive so that a tape drive is selected if it receives its corresponding selection signal, such that in response to switching from generation of said first selection signal to said selection signal, selection of said one drive is switched to another drive;

generating a pseudo-control signal which changes in a predetermined manner in response to said end of tape pulse so as to simulate said end of tape pulse if the switching means is in the non-automatic mode.

23. A method as recited in claim 22, further comprising the steps of: providing a controller for controlling said tape drives by transmitting command and data signals thereto; and introducing said simulated pulse to the controller such that the controller terminates its transmission of command and data signals.

* * * * *